United States Patent [19]

Bradbury

[11] 4,066,255
[45] Jan. 3, 1978

[54] DOCUMENT TRANSPORT SYSTEM

[75] Inventor: Wilburn F. Bradbury, Northbrook, Ill.

[73] Assignee: Addressograph-Multigraph Corporation, Cleveland, Ohio

[21] Appl. No.: 708,052

[22] Filed: July 23, 1976

[51] Int. Cl.² .................................................. B65H 5/02
[52] U.S. Cl. ........................................ 271/265; 271/275
[58] Field of Search ................... 271/275, 265, 4, 10, 271/3.1, 258, 227; 198/849, 846

[56] References Cited

U.S. PATENT DOCUMENTS

| 572,262 | 1/1896 | Kennel | 198/846 X |
| 2,946,428 | 7/1960 | Baker | 198/846 X |
| 3,095,192 | 6/1963 | Simjian | 271/265 X |
| 3,829,083 | 8/1974 | Shiina et al. | 271/4 |
| 3,936,041 | 2/1976 | Shina et al. | 271/265 X |

Primary Examiner—Bruce H. Stoner, Jr.
Attorney, Agent, or Firm—Ray S. Pyle

[57] ABSTRACT

The drawings and specification set forth a structure in which one sheet at a time is dispensed to a utilization device, which is a table top and a belt drag conveyor. As the sheet is dispensed from the feeder, it trips a switch which starts the utilization device and turns off the feeder. The utilization device may be a photocopier table, for example; and the drag conveyor brings the document to be copied to a specific register line without the use of stops which might damage the forward edge of a document. The system is coordinated by a controller which will supply the documents to be copied at a maximum rate one after the other for collating, or on command, according to operator preference.

2 Claims, 5 Drawing Figures

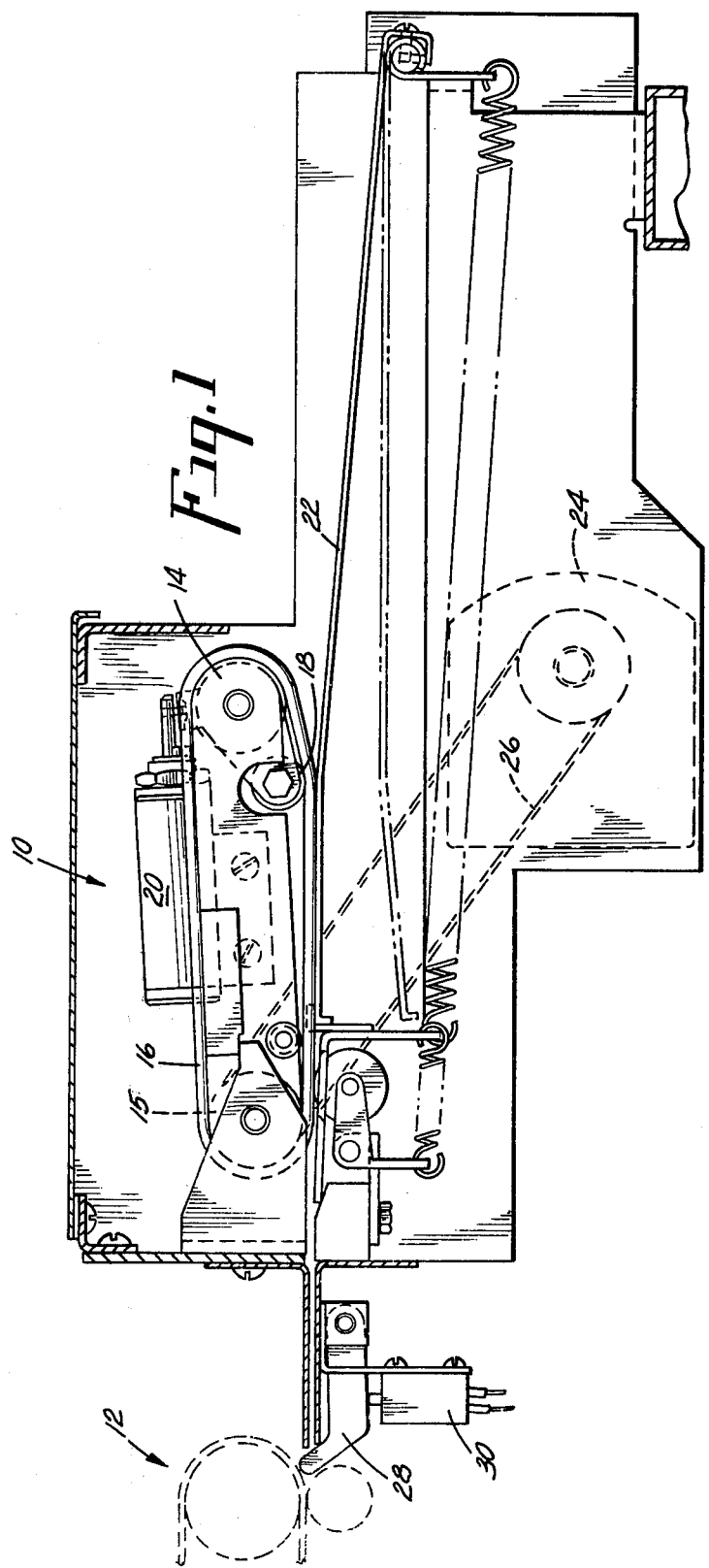

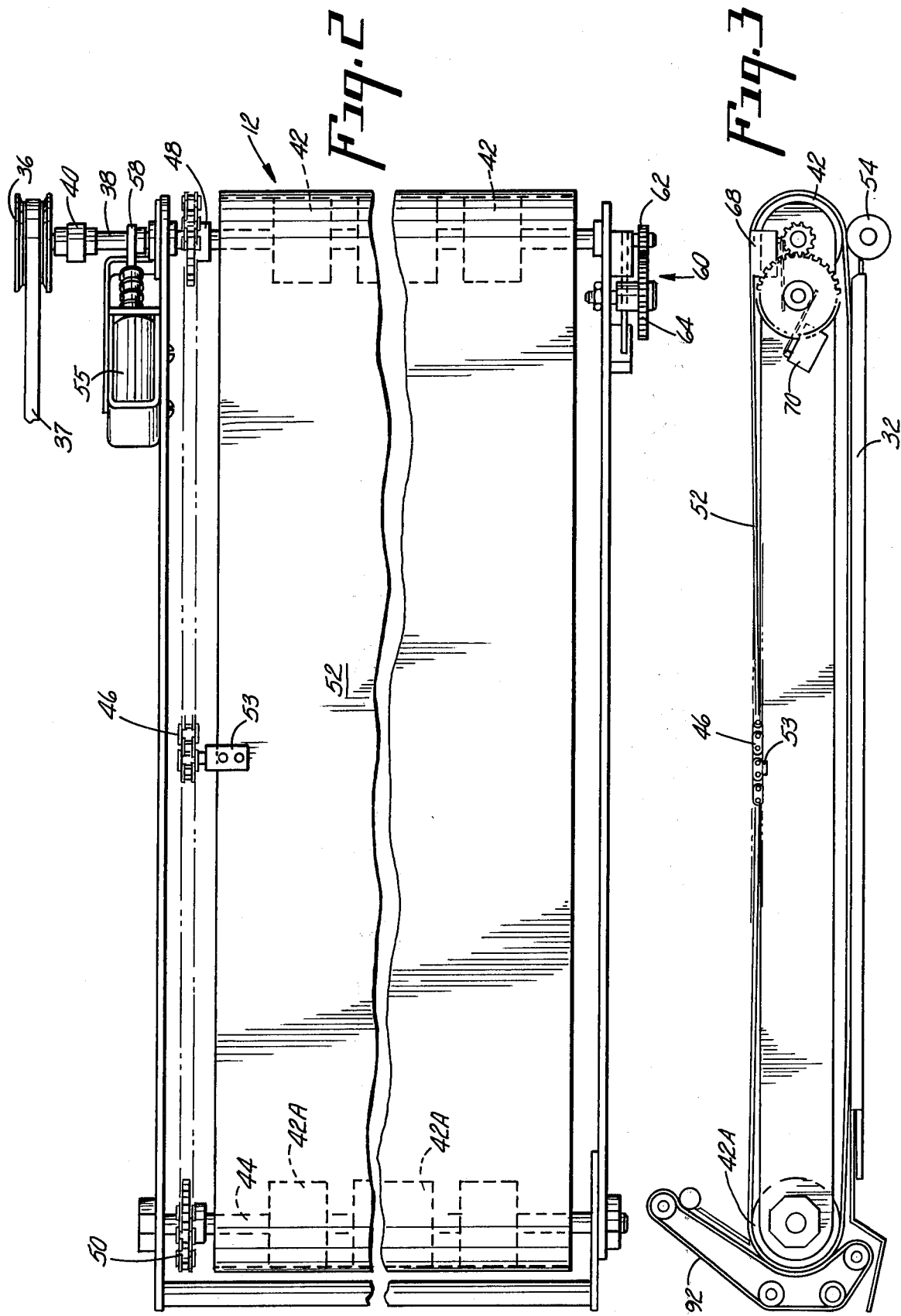

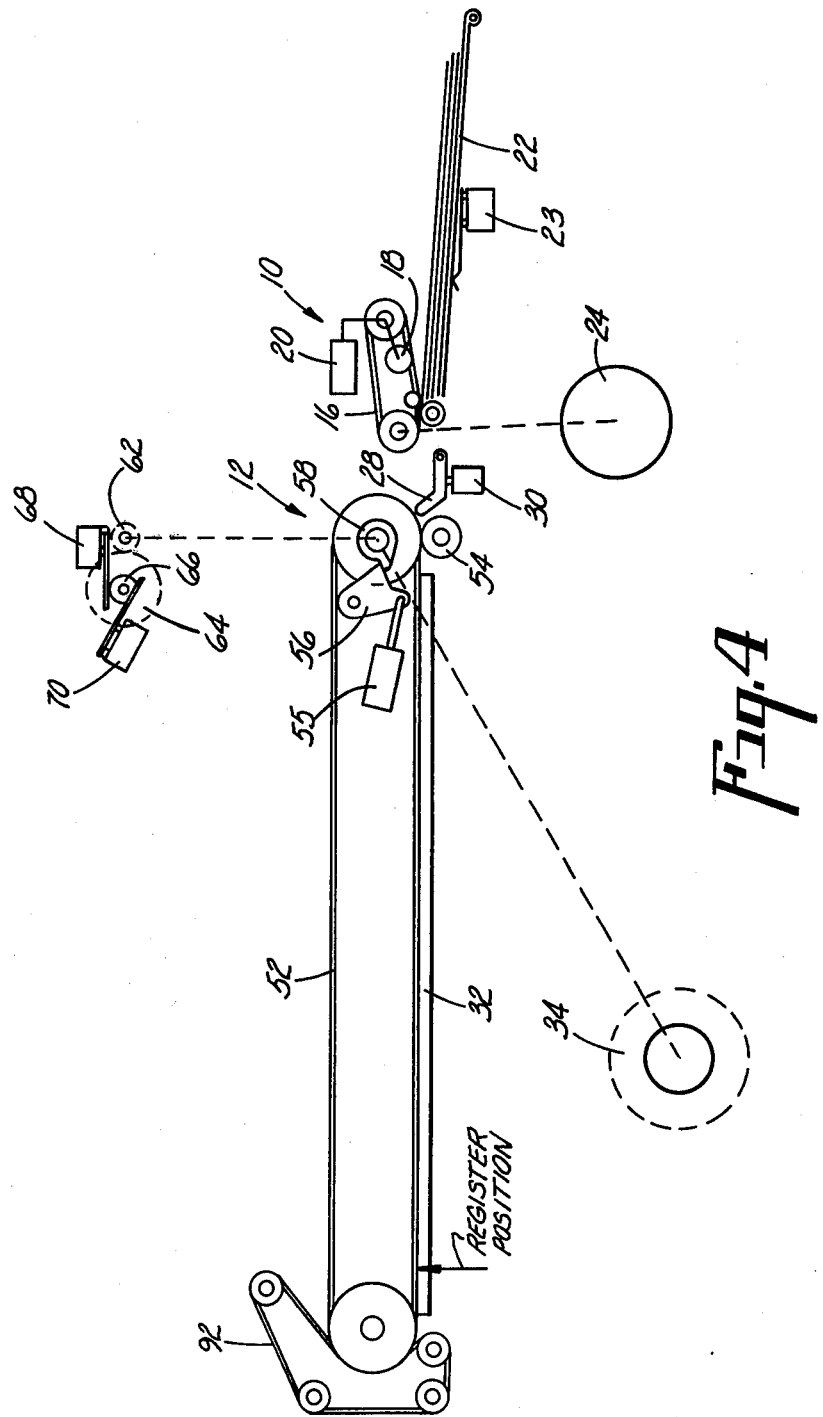

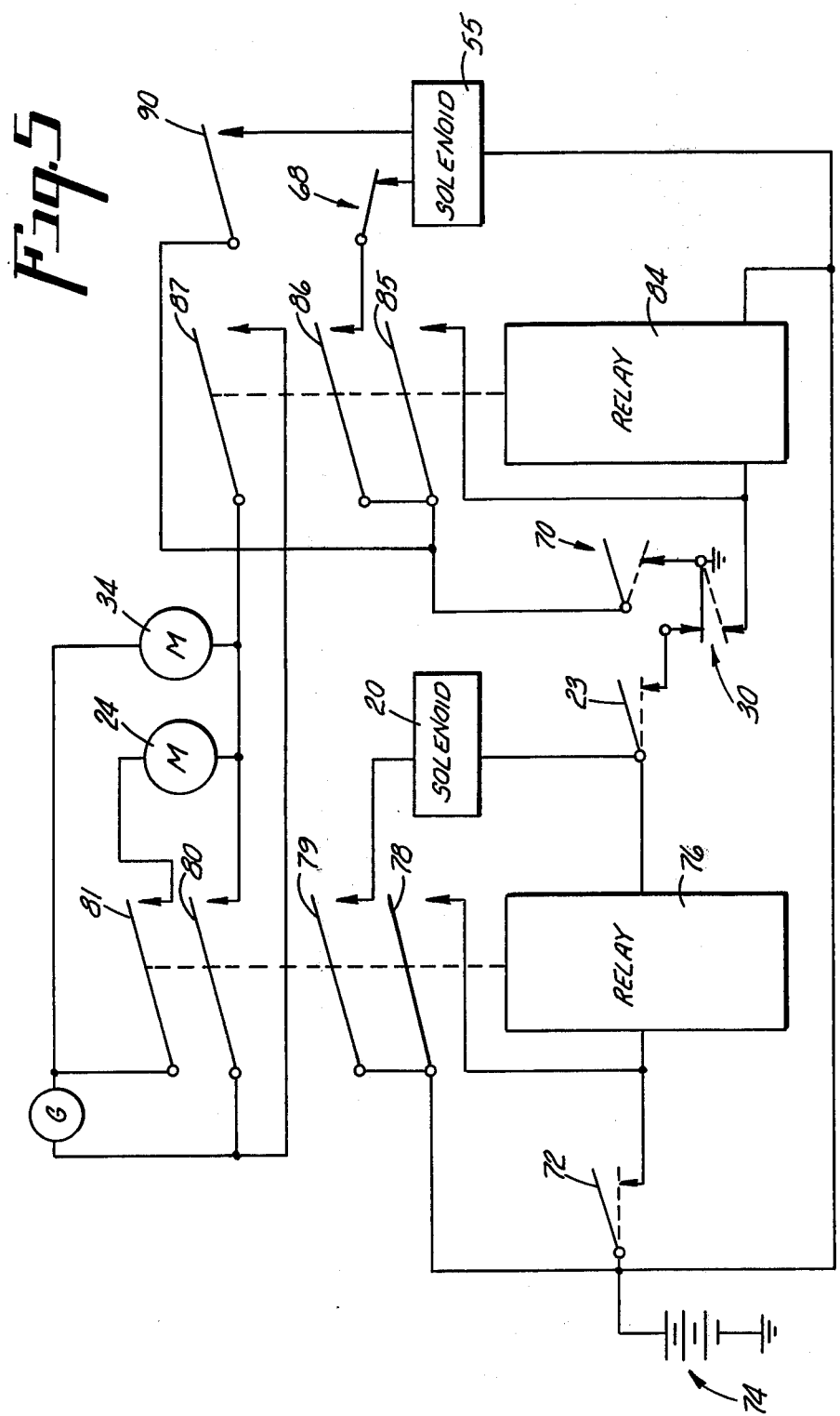

DOCUMENT TRANSPORT SYSTEM

BACKGROUND OF THE INVENTION

An important feature of this invention is the elimination of register stops acting against the leading edge of documents to be copied. Prior art mechanisms employing such stops have the undesirable characteristic of possibly damaging the forward edge of lightweight originals as they strike the stops. Furthermore, such stops will be imaged unless means are provided to retract them during an exposure.

Otherwise, position sensors have been employed to bring sheets to a stop position, with varying degrees of success.

SUMMARY OF THE INVENTION

An advantage of this invention is that no stop members are needed to bring a document to registration position on a processing table.

A further advantage and object of this invention is to enable a sheet feeder and copy machine to work in concert, to collate a copy set matching an original document set.

DESCRIPTION OF THE DRAWINGS

FIG. 1 is a side elevation illustration of the principal operating components of a sheet feeder;

FIG. 2 is a plane view illustration of the principal operating components of an embodiment of an electrostatic copier table to utilize sheets delivered by the FIG. 1 feeder;

FIG. 3 is a side elevation illustration of the copier table;

FIG. 4 is a schematic illustration of the combination of a feeder and utilization device of this invention; and FIG. 5 is an electrical control schematic.

DESCRIPTION OF THE PREFERRED EMBODIMENT

Although this device is reduced to practice in an operative embodiment, the drawings are schematic in order to eliminate non-essential detail which might otherwise confuse the proper illustration of the principles of this invention. FIGS. 1 and 2 are accurate as to the actual components illustrated, but some elements of the supporting equipment are stripped away to reveal the true operating components. The FIG. 4 is a teaching schematic illustration showing the working relationship of the mechanical parts, and FIG. 5 is the electrical control circuit which causes the parts to operate in concert. The illustrations are essentially that of a working embodiment of the invention which has proven successful in extensive testing.

The invention resides not only in a sheet utilization device, in this case as specifically a photocopy table for original documents, but the combination therewith of a sheet feed device which supplies sheets in sequence from a stack, and the electrical circuit which stops the operation of the feed device at the same time it initiates the unique operation of the photocopier utilization device.

The sheet feeder is represented in general by the reference character 10 in the FIG. 1. The utilization device, which is actually the glass support table of a photocopy machine, is indicated in general by the reference character 12 in both FIGS. 1 and 2. Documents from the feeder 10 are placed on the copier 12 by a feed device which operates over a measured distance rather than being stopped by the arrival of the sheet at a stop device on the table.

For the purpose of this description, the feeder 10 comprises two end drums 14 and 15 about which are reeved a series of drive belts 16. A bell crank system operates a roller 18 by means of power supplied from a solenoid motor 20 to distend the belts whenever a sheet is to be stripped from a stack of documents placed on a retractable bed 22. A sensor switch 23 detects the presence of a sheet on bed 22. Power is supplied to drive the belts 16 by means of a motor 24 operating through a belt 26. With the roller 18 lifted, the belts 16 are out of driving frictional contact with documents on the bed 22. In order to separate a top document from a stack, or a single document from table 22, the drive motor 24 activates the belts 16, and the solenoid 20 is activated to lower the roller 18 and force the belts against the top of the document. The belt is brought into contact with the paper by this action and the frictional drag force on the document causes the document to move forward from the feeder 10 toward the photocopier 12.

As the document is fed from feeder 10, toward the photocopier 12, it is caused to strike the operating switch arm 28 of a sensitive switch 30. Switch 30, shown in the electrical schematic of FIG. 5, stops operation of the feeder 10 and initiates operation of the conveyor portion of the photocopier 12.

FIGS. 2 and 3 illustrate the transport table of the photocopier 12.

FIGS. 2 and 3 can best be understood if compared with the schematic illustration of FIG. 4. The object to be accomplished, is to slide the proffered document across a transparent table 32 to a predetermined fixed registration position without the use of stop devices to bring the document, whatever its length, to that registration position. The lead edge of the document is to be positioned at the registration line and the tail end is permitted to extend the length of the document.

When the switch 30 is activated, a motor 34 is energized and is caused to drive a pulley 36 which in turn drives a main shaft 38. Shaft 38 is coupled to the pulley 36 by means of a slip clutch 40.

In the commercial use, to provide operator protection if the cover is removed, clutch 40 is on the output shaft of motor 34. The clutch 40 drives a pulley which is coupled to pulley 36 by a belt 37. In that arrangement, shaft 38 is directly coupled to pulley 36.

Shaft 38 carries an idler roller or series of idler rollers 42. A second shaft 44 carries idler rollers 42A. The shafts 38 and 44 are coupled by a positive drive means such as chain 46 driven by a sprocket 48 and driving a sprocket 50.

A wide belt 52, preferably having a white exterior surface, is reeved around the idlers 42 and 42A for guide support, but is keyed to the chain drive 46 by means of a tab 53 carried by the chain and riveted to one edge of the belt. Hence, drive of the shaft 38 causes an exact keyed drive of the belt 52, through the edge connection and not by the usual roller drive. This construction also prevents any tendency to run off the rollers. As best seen in FIG. 3, the belt 52 is allowed to sag and drag along the top surface of the transparent table bed 32. A roller 54 is an idler roller biased against the surface of belt 52 at a tangent point of the rollers 42 to form a nip therewith. The belt 52 is a friction drive pad and although may possibly be formed as a reciprocating device, has been found to be preferably constructed as an endless belt shown and described. The two shafts and their rollers constitute a means for moving the drive pad in yielding contact along the table surface 32 from an entrance end adjacent the nip of the belt and roller 54 to an exit end at the opposite end of table 32 where the belt pad loops around rollers 42A and lifts away from the table surface. The idler roller 54, forming a nip as it does with the belt 52, serves as a means for accepting a document from feeder 10 and inserting that sheet into the nip of the pad belt 52 and the surface of table 32 at the entrance end. Therefore, when the switch 30, being a means for detecting the presence of a document sheet at that nip, is activated, it provides a signal for a controller to cease operation of feeding and begin the placement of the delivered document sheet on table 32. The controller is a very simplified electrical circuit shown schematically in FIG. 5.

In the illustrated embodiment of the device, the motor 34 is a continuously running motor which drives the system through the friction slip clutch 40 (FIG. 2). When a document signals its presence by operating switch 30, the controller activates a transport solenoid 55 to retract a block 56 from the path of a rotating stop cam 58 carried by the shaft 38. With the block 56 interferring as shown in the FIG. 4, clutch 40 will slip and shaft 38 is stationery. When the solenoid 55 causes block 56 to retract, then the shaft 38 can turn under the drive impetus of the motor 34 via the pulley 36. The metering of the travel of the document being transported across table 32 is accomplished by means of a cam switch control shown generally in the area of reference numeral 60 in FIGS. 2 and 3. This control comprises generally a set of gears 62 and 64 having a fractional speed ratio. In the arrangement shown the gear 64 rotates one-fourth as rapidly as its drive gear 62. The smaller gear 62 is carried by shaft 38. A cam 66 has a flat surface as seen best in FIG. 4, which is used to operate switches 68 and 70.

The cooperation and function of the various switches will best be understood by reference to FIG. 5. A function switch 72 is generic in its representation in that it may be a manually operated button, a program operated switch, or a sensor which senses the presence of a document leaving the system. It may be all three of these devices. For the sake of illustration, assume switch 72 is an operator controlled pushbutton. A battery symbol 74 represents a source of low power control voltage. When switch 72 is closed it powers a relay 76 which closes a self-holding lock circuit through switch 78 and a switch 79 which closes the circuit to the feeder solenoid 20. If a document is in position upon the bed 22, the switch 23 will be closed and the solenoid 20 will receive power through the switch 79, switch 23, and through the switch 30, which is used as a normally closed switch with respect to solenoid 20.

The relay 76 also closes switches 80 and 81 to provide power from source "G" for both the motors 24 and 34. However, the belt 52 does not begin operation because it is locked by the pawl 56.

When the solenoid 20 and the motor 24 begin operating under the activation of relay 76, a document sheet is fed from the feeder to the switch 30. When switch 30 is moved from the full-line position shown in the FIG. 5 to the dotted outline position by the impact of a document, the power to relay 76 is broken, and the solenoid 20 and the motor 24 cease to operate.

Also, the switch 80 opens, which as illustrated in FIG. 5 and thus far described, would apparently cease operation of motor 34. However, when the switch 30 moves to the dotted outline position, it places a relay 84 into operation and pulls in a holding circuit switch 85, and switches 86 and 87. Therefore, the switch 87 is closed substantially simultaneously with the opening of switch 80, and the motor 34 is kept into a power circuit although the motor 24 is inactivated.

When the relay 84 is activated as described, solenoid 55 is placed in circuit through the closed switch 68 of the cam switch contact 60. Solenoid 55 then pulls the pawl 56 away from the stop cam 58 and allows the shaft 38 to begin to drive the drive pad belt 52. The sheet, having tripped the switch 30, which is the detector at the nip of the pad and table surface, moves onwardly into the nip, which is now dynamic, and is clamped between the surface of idler 54 and the moving surface of the belt 52. The sheet is then caused to move onto the table and begin to move with the frictional drag surface of the belt 52 on the table.

The first operation of the shaft 38 causes the cam 66 to close the normally open home switch 70 and keep relay 84 in an active circuit after the document has passed by and released the switch 30. Then, the four-to-one ratio of gear 62 and gear 64 will permit slightly over two revolutions of the rollers 42 before bringing the flat surface of the cam 66 into position to allow opening of the registration switch 68. It will be noted that this switch is a normally open switch which is held in closed condition by cam 66 at the time a document is entering the nip formed by the pad and the table surface. For this reason the switch 68 is illustrated as closed in FIG. 5. When switch 68 is opened, the solenoid 55 is deactivated and the pawl 56 is returned by spring action (not illustrated) to engage the stop cam 58 at the end of three revolutions and halt the advance of the document on table 32. The diameter of the rollers 42 is approximately equal to the pitch diameter of the drive sprocket and is selected to transport sufficient of the belt 52 to cause a sheet entering the nip of the table to come to a specific registration position on the table and halt at that position without any type of stop device acting against the document.

The document, after coming to rest, may be exposed by a photocopier device, and at the end of the exposure, whether by program control or light sensitive devices, a switch 90 is caused to close thereby reactivating solenoid 55 and once again withdrawing pawl 56 to allow the shaft 38 to turn for one more revolution to bring the flat spot of the cam 66 into position wherein the home switch 70 is caused to open and deactivate relay 84. Deactivation of relay 84 opens switch 87 and brings the motor 34 to a halt.

The final turn of the shaft 38 will cause the document sheet in position upon table 32 to proceed off of the table into any receptacle or further processing desired. In the FIG. 4 an exit turnaround device 92 is illustrated, being a particular application structure desired. However, the document could proceed directly off of the table if the surrounding structure so dictated. In any event, the normal length of document will cause a tail portion of the document to remain engaged between table 32 and belt 52 under normal circumstances. If only one sheet is being processed, the operator or a processing device could grasp the sheet and pull it from the engaged position because the gripping action is very light. However, this device was designed as a repetitive action copy machine to process an entire stack of sheets and consequently, as long as switch 23 detects the presence of a document on the bed 22, the program will recycle to reinitiate operation of the processing system and thereafter cause sequential repeat of the steps wherein the sheet feeder is caused to separate and forward one sheet from the holder, be detected at the nip, be driven on to the pad, partially ejected after the processing step and then recycled again as long as documents remain to be processed.

Not illustrated, but being built into the circuit of the switch 23, is a program chip which causes a false end-of-exposure routine to close the switch 90 and eject the final sheet from the machine by one last additional rotation of the cam 66.

What is claimed is:

1. In a photocopier having a transparent document positioning table, first and second spaced belt guides positioned above said table, a belt reeved over said guides with the bottom run resting on said table and a return run extending between the tops of said guides, said belt forming an entrance nip as it loops over said first guide to the table surface, the provision of a drive system for said belt to cause said belt to first move a sheet presented to the entrance nip to an exposure station on said table, to pause, and then resume moving to initiate exit of the sheet, comprising:

a rotatable power driven shaft connected to said belt to drive said belt;

means to sense presentation of the lead edge of a sheet to said nip and to initiate rotation of said power driven shaft and the resulting belt drive motion in response thereto;

a circuit control means for:
1. assuming control of said belt drive motion from said means to initiate rotation in response to initial rotation of said power driven shaft;
2. continuing the drive motion of the belt for a predetermined belt advancement across the table sufficient to have transported the sensed lead edge of a sheet from said nip to a predetermined lead edge position for exposure, and then stopping the drive at that position; and
3. reinstating drive motion of the belt subsequent to an exposure sequence, for a further travel sufficient to have transported a sheet off of the exposure station.

2. A photocopier as set forth in claim 1 in which said circuit control means includes a switch cam and a plurality of switches riding said cam, said cam being in a driven relationship to said power driven shaft such that the circuit control cam rotates one time while the power driven shaft rotates more than one time;

a holding circuit for controlling rotation of said power shaft, a first one of said switches reacting to initial shaft rotation to energize said holding circuit to keep said shaft in motion after a transported sheet passes said means to sense presentation of the lead edge;

a second one of said switches and the cam cooperating to alter said holding circuit for stopping said shaft and the belt after a cam predetermined travel of the shaft and belt; and said cam being structured such that after reinitiation of drive motion of the belt, the first of said switches is caused to deenergize the holding circuit upon said cam turning to the end of its one rotation, whereby, a major fractional portion of the control cam rotation may be employed to advance the belt and the sheet upon the table, arresting the latter with its leading edge at said predetermined lead edge position, and the remaining minor fractional portion may be employed to cause the belt drive to again cease after being reinitiated.

* * * * *